(12) United States Patent
Nagatomo

(10) Patent No.: US 8,319,661 B2
(45) Date of Patent: Nov. 27, 2012

(54) INFORMATION DISTRIBUTION SYSTEM AND VEHICLE-MOUNTED DEVICE

(75) Inventor: Hideyuki Nagatomo, Kawasaki (JP)

(73) Assignee: Kabushiki Kaisha Kenwood, Hachiouji-shi, Tokyo (JP)

( * ) Notice: Subject to any disclaimer, the term of this patent is extended or adjusted under 35 U.S.C. 154(b) by 346 days.

(21) Appl. No.: 12/808,447

(22) PCT Filed: Dec. 18, 2008

(86) PCT No.: PCT/JP2008/073033
§ 371 (c)(1),
(2), (4) Date: Jun. 16, 2010

(87) PCT Pub. No.: WO2009/081829
PCT Pub. Date: Jul. 2, 2009

(65) Prior Publication Data
US 2011/0133953 A1    Jun. 9, 2011

(30) Foreign Application Priority Data

Dec. 21, 2007  (JP) .................................. 2007-330595

(51) Int. Cl.
*G08G 1/0967* (2006.01)
(52) U.S. Cl. ..................... 340/905; 340/995.13; 701/400
(58) Field of Classification Search .................. 340/905, 340/995.1, 995.12, 995.13, 996, 901; 701/201, 701/400, 428, 441
See application file for complete search history.

(56) References Cited

U.S. PATENT DOCUMENTS

| | | | |
|---|---|---|---|
| 4,882,696 A | | 11/1989 | Nimura et al. |
| 5,508,917 A | * | 4/1996 | Siegle et al. ................. 701/428 |
| 5,819,198 A | * | 10/1998 | Peretz ........................... 701/117 |
| 5,839,086 A | * | 11/1998 | Hirano ......................... 701/420 |
| 6,466,862 B1 | * | 10/2002 | DeKock et al. ............... 701/117 |
| 6,943,702 B2 | * | 9/2005 | Kato ............................ 340/988 |
| 7,427,928 B2 | * | 9/2008 | Crocker et al. ............... 340/902 |
| 8,165,748 B2 | * | 4/2012 | Goto et al. ...................... 701/36 |

FOREIGN PATENT DOCUMENTS

| | | |
|---|---|---|
| EP | 0 375 817 | 7/1990 |
| JP | 64-016915 | 1/1989 |

(Continued)

OTHER PUBLICATIONS

Notification of Transmittal of Translation of the International Preliminary Report on Patentability (Application No. PCT/JP2008/073033) dated Sep. 2, 2010.
Supplementary European Search Report (Application No. 08863808.5) dated May 7, 2012.

(Continued)

*Primary Examiner* — Toan N Pham
(74) *Attorney, Agent, or Firm* — Eric J. Robinson; Robinson Intellectual Property Law Office, P.C.

(57) ABSTRACT

An information distribution system includes a roadside apparatus which transmits an utterance type provided information containing audio instruction information based on a traveling direction to be provided by the utterance type provided information. When an vehicle-mounted device receives an utterance type provided information via a communication unit from the roadside apparatus, the vehicle-mounted device outputs different utterance type provided information by an audio in accordance with the audio instruction in-formation contained in the received utterance type provided information, so that a vehicle driver can judge whether the information provided from the roadside apparatus is significant information.

6 Claims, 9 Drawing Sheets

FOREIGN PATENT DOCUMENTS

| | | |
|---|---|---|
| JP | 2007-279975 | 10/2007 |
| WO | WO 98/06080 | 2/1998 |
| WO | WO 2006/075606 | 7/2006 |
| WO | WO 2007/114086 | 10/2007 |

OTHER PUBLICATIONS

International Search Report for Application Serial No. PCT/JP2008/073033.

* cited by examiner

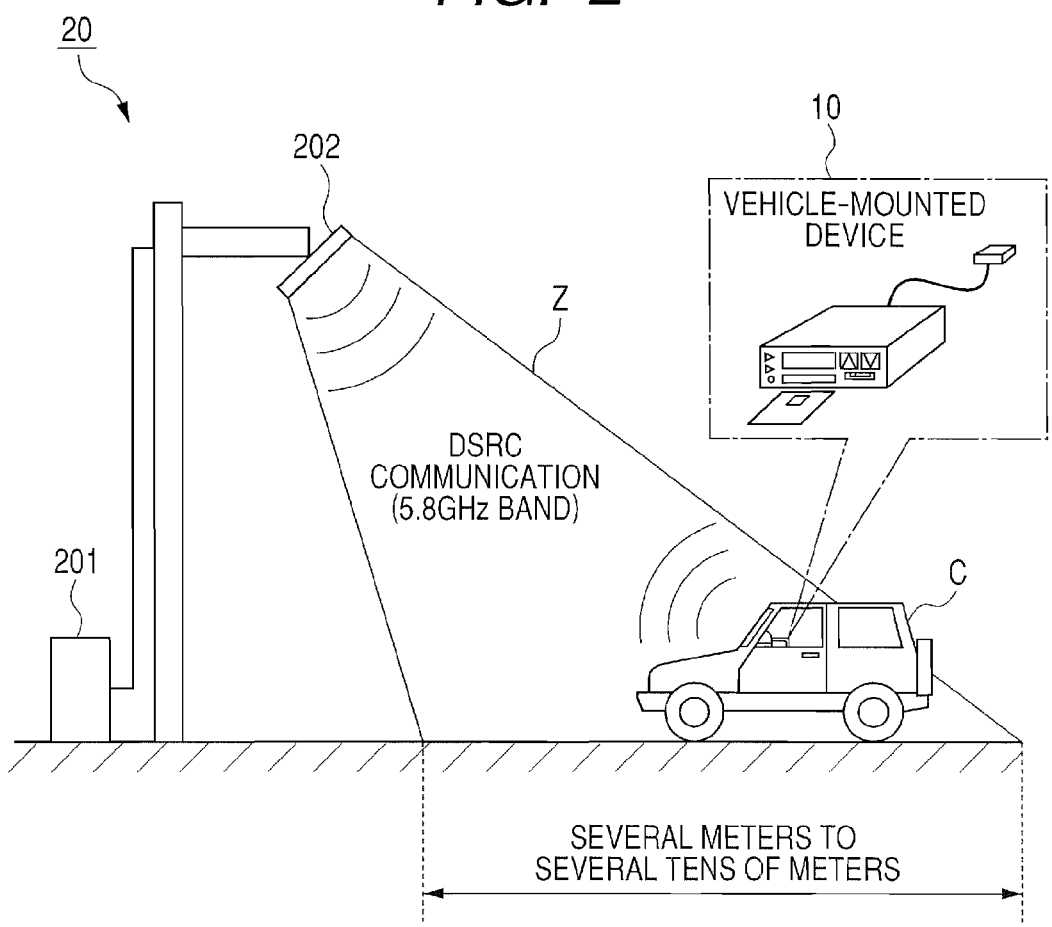

FIG. 3

| | |
|---|---|
| IDLE | |
| INFORMATION PROVISION TIME (HOUR) | |
| CURRENT POSITION INFORMATION → INFORMATION PROVISION TIME (MINUTE) | |
| IDLE | |
| INFORMATION PROVISION DIRECTION EXISTENCE FLAG | |
| INFORMATION PROVISION DIRECTION | |
| IDLE | |
| ROAD DISTINCTION | ～D1 |
| IDLE | |
| DIRECTION CODE | ～D2 |
| STARTING POINT NUMBER | |
| SID RELATION | |
| ROAD SERVICE SPEED | |
| THE NUMBER OF INFORMATION BYTES | |
| THE NUMBER OF SPEECH INFORMATION DISTINCTIONS | |
| UTTERANCE INFORMATION — SPEECH 1 — THE NUMBER OF INFORMATION BYTES | |
| IDLE | |
| LANGUAGE DISCRIMINATION FLAG | |
| AUDIO FORMAT DISCRIMINATION FILE | |
| FILE INFORMATION STORAGE UNIT (SPEECH READING-OUT INFORMATION) | |
| SPEECH n — THE NUMBER OF INFORMATION BYTES | |
| IDLE | |
| LANGUAGE DISCRIMINATION FLAG | |
| AUDIO FORMAT DISCRIMINATION FILE | |
| FILE INFORMATION STORAGE UNIT (SPEECH READING-OUT INFORMATION) | |

D3 brackets the UTTERANCE INFORMATION section.

| DIRECTION CODE | SPEECH ELEMENTS ||
| --- | --- | --- |
| | TALKER | PITCH |
| 1: INBOUND | MALE | 5 |
| 2: OUTBOUND | FEMALE | 5 |
| 3: INNER LANE | MALE | 3 |
| 4: OUTER LANE | FEMALE | 3 |
| ⋮ | ⋮ | ⋮ |

INFORMATION DISTRIBUTION SYSTEM AND VEHICLE-MOUNTED DEVICE

TECHNICAL FIELD

The present invention relates to an information distribution system and a vehicle-mounted device.

BACKGROUND ART

Conventionally, a vehicle-mounted device can use DSRC (Dedicated Short Range Communication) to perform short range wireless communication with a roadside apparatus installed on a road, and can be provided with information by speech from a center apparatus via the roadside apparatus. In the communication using the DSRC, only while a vehicle exists in a communication area of the roadside apparatus, two-way communication between the vehicle-mounted device on the vehicle and the roadside apparatus is enabled, and in this period, the center apparatus distributes various information for supporting safety, such as traffic situation information, disaster point information, road freezing point information, curve information, and junction point information, on a lane ahead on which the vehicle travels, via the roadside apparatus.

For example, a roadside apparatus installed near an inbound lane emits a DSRC radial electric wave to a vehicle-mounted device mounted on a vehicle traveling on the inbound lane, and distributes information related to the inbound lane. Moreover, a roadside apparatus installed near an outbound lane emits a DSRC radial electric wave to a vehicle-mounted device mounted on a vehicle traveling on the outbound lane, and distributes information related to the outbound lane.

However, the radial electric wave may be reflected on the vehicle or by a construction such as a building, and the reflected electric wave may be directly leaked to an adjacent lane. In this case, an utterance type vehicle-mounted device not having a navigation function cannot discriminate which direction the vehicle itself is traveling in, and thus may erroneously receive information transmitted to a vehicle traveling on an opposite lane, and may erroneously perform speech output of information related to the road related to the opposite lane. For example, while a driver is traveling on the inbound lane, an electric wave reflected from an adjacent outbound lane may be received, the information related to the outbound lane may be outputted, and the driver may be confused.

Consequently, in the communication using the DSRC, a technique has been proposed in which erroneous communication is prevented from being performed due to the electric wave leaked to the adjacent lane. For example, Patent Document 1 describes a technique for causing an electric wave reflected by a road surface to be incident on an electric wave absorber to absorb the electric wave, and preventing defects caused by an unnecessary leakage electric wave.

Patent Document 1: Japanese Patent Application Laid-Open No. 2002-237719

DISCLOSURE OF THE INVENTION

Problems to be Solved by the Invention

However, in Patent Document 1, the electric wave absorber for preventing irregular reflection or the leakage of the electric wave needs to be provided on the road along with the roadside apparatus. Moreover, even if an irregularly-reflected or leaked electric wave is erroneously received by the vehicle-mounted device at a place where such an electric wave absorber is not provided, the driver cannot comprehend it.

An object of the present invention is to enable the driver to comprehend whether or not the information provided by the roadside apparatus is significant information for his own vehicle.

Means for Solving the Problems

In order to solve the above described problems, an information distribution system of the present invention is an information distribution system including a roadside apparatus which is installed on a road, and which emits a radial electric wave to a predetermined area on the road to form a communication area, and transmits provided information to a vehicle which has entered this communication area, and a vehicle-mounted device which is mounted on a vehicle, and which includes receiving means for performing wireless communication with the roadside apparatus to receive the provided information when the vehicle has entered the communication area, wherein the vehicle-mounted device includes control means for generating a speech signal from utterance information in the provided information received by the receiving means; and speech output means for outputting speech by the speech signal.

Information indicating which traveling direction on the road is to be provided with the provided information is included in the provided information transmitted by the roadside apparatus, and the control means of the vehicle-mounted device causes the speech output means to output the received provided information by different speech, according to the traveling direction to be provided with the provided information received by the receiving means.

The control means of the vehicle-mounted device causes the speech output means to output the received provided information by speech in which at least any one of a talker and pitch is different, according to the traveling direction to be provided with the provided information received by the receiving means.

A vehicle-mounted device of the present invention is mounted on a vehicle, and includes receiving means for, when the vehicle has entered a communication area of a roadside apparatus which is installed on a road, performing wireless communication with the roadside apparatus to receive provided information, and includes control means for generating a speech signal from utterance information in the provided information received by the receiving means; and speech output means for outputting speech by the speech signal.

Information indicating which traveling direction on the road is to be provided with the provided information is included in the provided information received from the roadside apparatus by the receiving means, and the control means causes the speech output means to output the received provided information by different speech, according to the traveling direction to be provided with the provided information received by the receiving means.

The control means causes the speech output means to output the received information by speech in which at least one of a talker and pitch is different, according to the traveling direction to be provided with the provided information received by the receiving means.

Effect of the Invention

According to the present invention, the driver can comprehend whether or not the information provided by the roadside apparatus is the significant information for his own vehicle.

BRIEF DESCRIPTION OF THE DRAWINGS

FIG. 2 is a diagram for explaining a roadside apparatus of FIG. 1 and a communication area;

FIG. 3 is a diagram showing a data configuration example of utterance type provided information transmitted from the roadside apparatus to a vehicle-mounted device;

DESCRIPTION OF SYMBOLS

Figure 1:
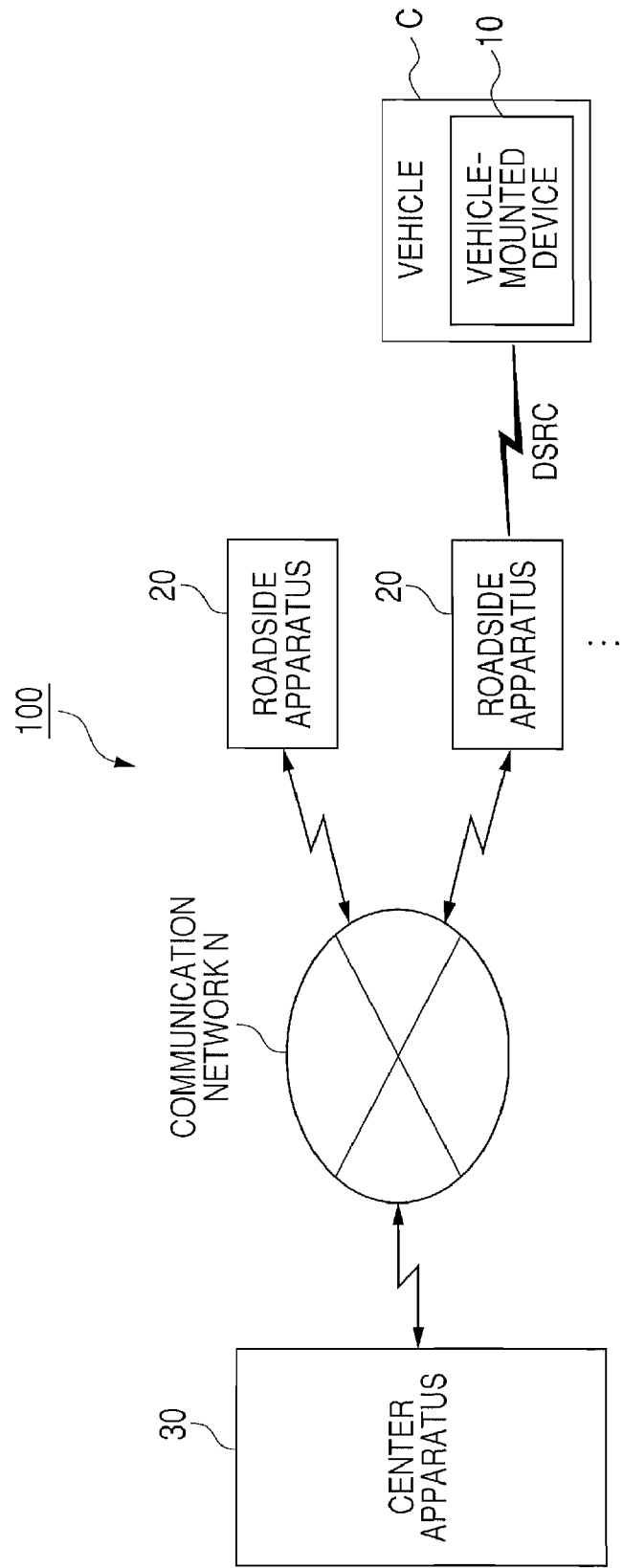
FIG. 1 is a diagram showing an overall configuration of an information distribution system of an embodiment according to the present invention.

100 Information distribution system
10 Vehicle-mounted device
11 Control unit
12 ROM
13 RAM
14 Communication unit
14a Antenna
14b DSRC module
15 Audio processing unit
16 Loudspeaker
17 Operation unit
18 Storage device
181 Speech table
19 Display unit
20A roadside apparatus
20B roadside apparatus
201 Main body apparatus
202 Antenna
30 Center apparatus

BEST MODES FOR CARRYING OUT THE INVENTION

Hereinafter, embodiments according to the present invention will be described in detail with reference to the accompanying drawings. However, while an utterance type vehicle-mounted device will be described in the embodiments, the scope of the invention is not limited to examples shown in the drawings, and the invention is also applied to a vehicle-mounted device which connects to an apparatus having a navigation function and includes image information, text information and the like in addition to audio information, in an ITS (Intelligent Transport Systems) vehicle-mounted device in which communication with the vehicle-mounted device is performed from a center apparatus via a roadside apparatus.

First Embodiment

First, a configuration of a first embodiment will be described.

FIG. 1 shows a system configuration of an information distribution system 100 in the first embodiment.

As shown in FIG. 1, the information distribution system 100 is configured to include a vehicle-mounted device 10 mounted on a vehicle C, a roadside apparatus 20, and a center apparatus 30, and the center apparatus 30 distributes utterance type provided information for supporting safe driving, by speech to the vehicle-mounted device 10 via the roadside apparatus 20.

The utterance type provided information includes, for example, traffic situation information, disaster point information, road freezing point information, curve information, junction point information and the like on a lane ahead on which the vehicle-mounted device 10 is traveling.

Hereinafter, each apparatus included therein will be described in detail.

(Center Apparatus 30)

The center apparatus 30 stores the utterance type provided information, and distributes the utterance type provided information via the roadside apparatus 20 to the vehicle-mounted device 10. As the center apparatus 30, a computer terminal including a control unit for performing distribution control, a communication unit for performing communication with the roadside apparatus 20, and a storage unit for storing the utterance type provided information, and the like are applicable.

While FIG. 1 shows only one center apparatus 30, there are a plurality of distributors which distribute the utterance type provided information, including distributors which distribute local information, and the center apparatus 30 is provided for each distributor.

(Roadside Apparatus 20)

The roadside apparatus 20 is installed along a lane on a road, and is connected to the center apparatus 30 via a communication network N such as an IP network dedicated to DSRC. Moreover, wireless communication is enabled between the roadside apparatus 20 and the vehicle-mounted device 10 of the vehicle C traveling on the road.

The roadside apparatus 20 is configured with a main body apparatus 201 and an antenna 202, as shown respectively in FIG. 2. The roadside apparatus 20 emits a DSRC radial electric wave with a limited arrival distance, from the antenna 202 installed near the road, such as at a side of the road or above the road, and forms a communication area Z near the roadside apparatus 20. Two-way short range wireless communication is enabled only with the vehicle-mounted device 10 of the vehicle C which has entered this communication area Z. Hereinafter, the short range wireless communication between the roadside apparatus 20 and the vehicle-mounted device 10 may be referred to as "road-to-vehicle communication".

The DSRC is a communication system using an electric wave of 5.8 GHz band, and as shown in FIG. 2, a communication range thereof is, for example, several meters to several tens of meters. Since all DSRC transmission outputs from the roadside apparatus 20 are set to an equal degree, the respective communication areas Z formed by a plurality of the roadside apparatuses 20 are approximately constant regardless of installation locations.

The main body apparatus 201 performs a process for serving as an intermediary for communication of the information between the vehicle-mounted device 10 and the center apparatus 30. In other words, the main body apparatus 201 stores various information including the utterance type provided information which has been previously transmitted from the center apparatus 30, and when the vehicle C enters the communication area Z, the main body apparatus 201 performs the communication with the vehicle-mounted device 10 mounted on this vehicle C, via the antenna 202, and distributes the various information transmitted from the center apparatus 30, to the vehicle-mounted device 10. As the main body apparatus 201, a computer terminal including a control unit for performing information processing and communication control, a storage unit and the like is applicable.

FIG. 3 shows an example of the utterance type provided information transmitted from the roadside apparatus 20 to the vehicle-mounted device 10. As shown in FIG. 3, the utterance type provided information includes utterance information D3 for causing the vehicle-mounted device 10 to utter (speech output) the above described utterance type provided information, including speech reading-out information, and in addition, information related to the lane to be provided with the above described utterance type provided information, such as a road distinction D1 (for example, 1: expressway, . . . , 4: general national highway, . . . , 6: principal local road . . . ) and a direction code D2 (1: inbound, 2: outbound, 3: inner lane, 4: outer lane, . . . 15: no information).

The speech reading-out information is described, for example, in an intermediate language such as TTS (Text to Speech), and in the present embodiment, the speech reading-out information transmitted from the roadside apparatus 20 includes audio instruction information which instructs about speech by which the information described in the speech reading-out information is uttered, at a beginning part of the speech reading-out information. Contents of the instruction from the audio instruction information include information on a talker (male/female/child . . . ), pitch (pitch), volume and the like, and for example, the speech reading-out information "F5V6_soon" mean that "soon" is uttered by the speech of "F=Female (female voice)", "pitch 5" and "V=Volume 6". Here, in the utterance type provided information transmitted from the roadside apparatus 20, in order to enable a driver to discriminate which traveling direction lane the utterance type provided information is related to, based on the speech by which the utterance type provided information is uttered, the audio instruction information has been set so that at least any one of the talker and the pitch is different according to the direction code D2 indicating a traveling direction (inbound, outbound, inner lane, outer lane and the like) to be provided with the utterance type provided information.

(Vehicle-Mounted Device 10)

The vehicle-mounted device 10 is the utterance type vehicle-mounted device mounted on the vehicle C. The vehicle-mounted device 10 has a DSRC function for performing the communication based on the DSRC with the roadside apparatus 20, and performs the speech output of the utterance type provided information distributed from the roadside apparatus 20 through the road-to-vehicle communication, and thereby provides various information for supporting the safe driving to the driver.

Figure 4:
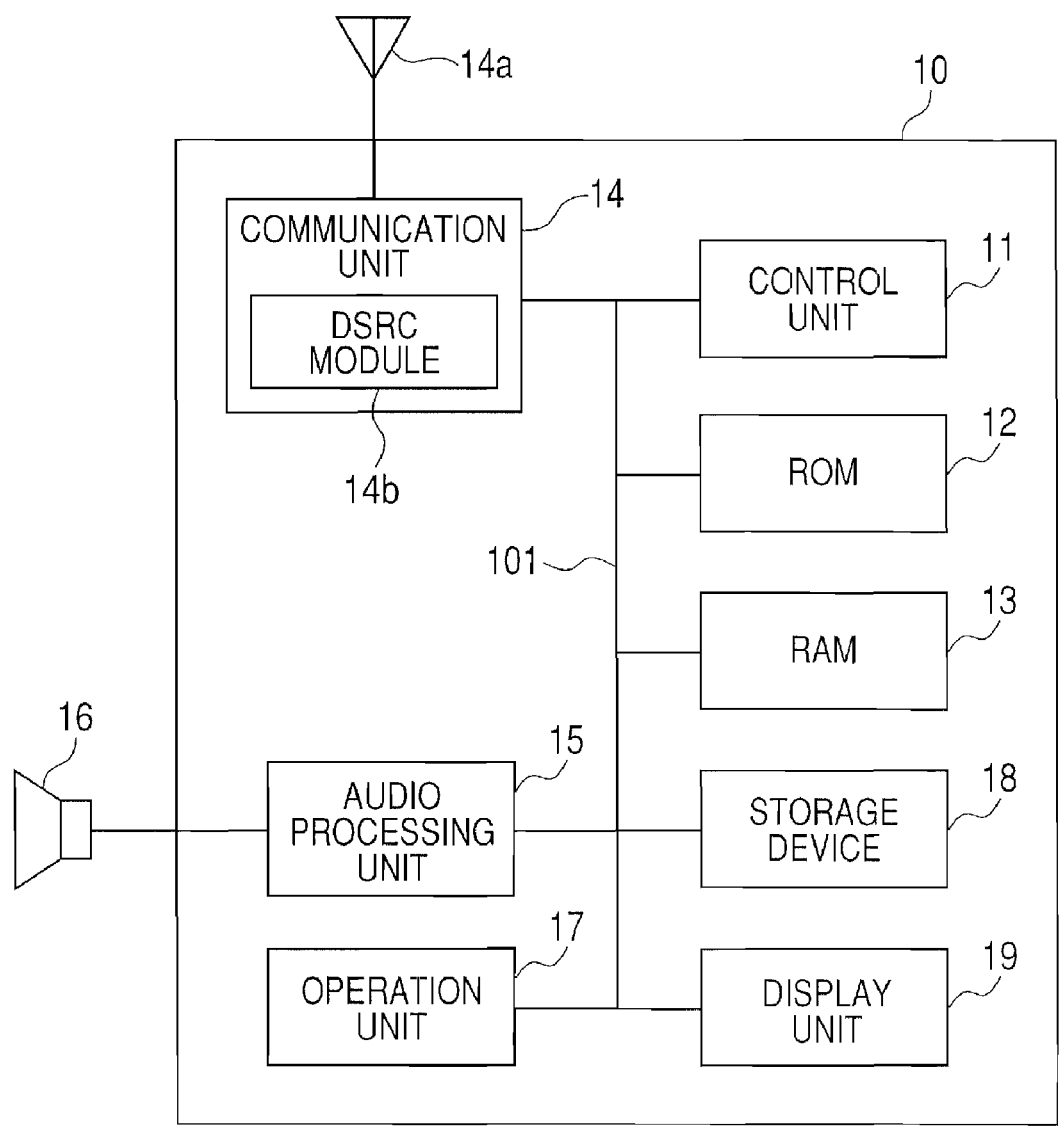
FIG. 4 is a block diagram showing a functional configuration of the vehicle-mounted device of FIG. 1.

As shown in FIG. 4, the vehicle-mounted device 10 is configured to include a control unit 11, a ROM 12, a RAM 13, a communication unit 14, an audio processing unit 15, a loudspeaker 16, an operation unit 17, a storage device 18 and a display unit 19, and the respective units are connected via a bus 101. It should be noted that, as shown in FIG. 4, the vehicle-mounted device 10 does not include a navigation function for specifying a position or a traveling direction of the vehicle itself, such as a GPS (Global Positioning System).

The control unit 11 is configured with a CPU (Central Processing Unit) and the like, and reads out a system program and various processing programs stored in the ROM (Read Only Memory) 12, expands the system program and the various processing programs into the RAM (Random Access Memory) 13, and controls the respective units in the vehicle-mounted device 10 in a centralized manner, according to the expanded programs.

The ROM 12 stores various programs including a system program corresponding to the vehicle-mounted device 10 and an utterance control processing program which is executable on the system program, data required for executing these programs, and the like. The various programs are stored in a form of computer-readable program codes in the ROM 12, and the control unit 11 sequentially executes operations according to the program codes.

The RAM 13 forms a work area for temporarily storing the various programs read out from the ROM 12, input or output data, parameters and the like, in various processes executed and controlled by the control unit 11.

The communication unit 14 includes an antenna 14*a*, and a DSRC module 14*b* for transmitting/receiving data including the utterance type provided information to/from the roadside apparatus 20, through the two-way short range wireless communication based on the DSRC.

When the DSRC module 14*b* arrives within the communication area Z of the roadside apparatus 20, the DSRC module 14*b* receives the DSRC radial electric wave emitted from the roadside apparatus 20, by means of the antenna 14*a*, and performs a communication connection process with the roadside apparatus 20 based on the DSRC. When the communication with the roadside apparatus 20 is established, and the utterance type provided information is received from the roadside apparatus 20, the received utterance type provided information is outputted to the control unit 11.

The audio processing unit 15 generates a synthesized speech signal based on the speech reading-out information described in the intermediate language such as the TTS. For example, the audio processing unit 15 analyzes the speech reading-out information, synthesizes a speech waveform with the talker (male, female, child and the like), the pitch and the like which have been set by the control unit 11, and outputs this synthesized speech signal to the loudspeaker 16.

The loudspeaker 16 outputs the synthesized speech signal inputted by the audio processing unit 15.

The operation unit 17 includes a power key, and various keys associated with various functions, and outputs an operation signal corresponding to an operated key, to the control unit 11.

The storage device 18 is configured with a semiconductor nonvolatile memory or the like, and stores various data including the utterance type provided information received by the communication unit 14 and setting information related to the vehicle-mounted device 10.

The display unit 19 is configured with a color liquid crystal display or the like, and displays the various information on a display screen according to an instruction from the control unit 11.

(Operations of Information Distribution System 100 in First Embodiment)

Hereinafter, operations of the information providing system 100 in the first embodiment will be described.

When the vehicle C enters the communication area Z of the roadside apparatus 20, the main body apparatus 201 of the roadside apparatus 20 performs the two-way short range wireless communication with the vehicle-mounted device 10 mounted on the vehicle C, via the antenna 202, and transmits the utterance type provided information which has been previously transmitted from the center apparatus 30, to the vehicle-mounted device 10 via the antenna 202.

When power is turned ON, the vehicle-mounted device 10 executes an utterance control process.

Figure 5:
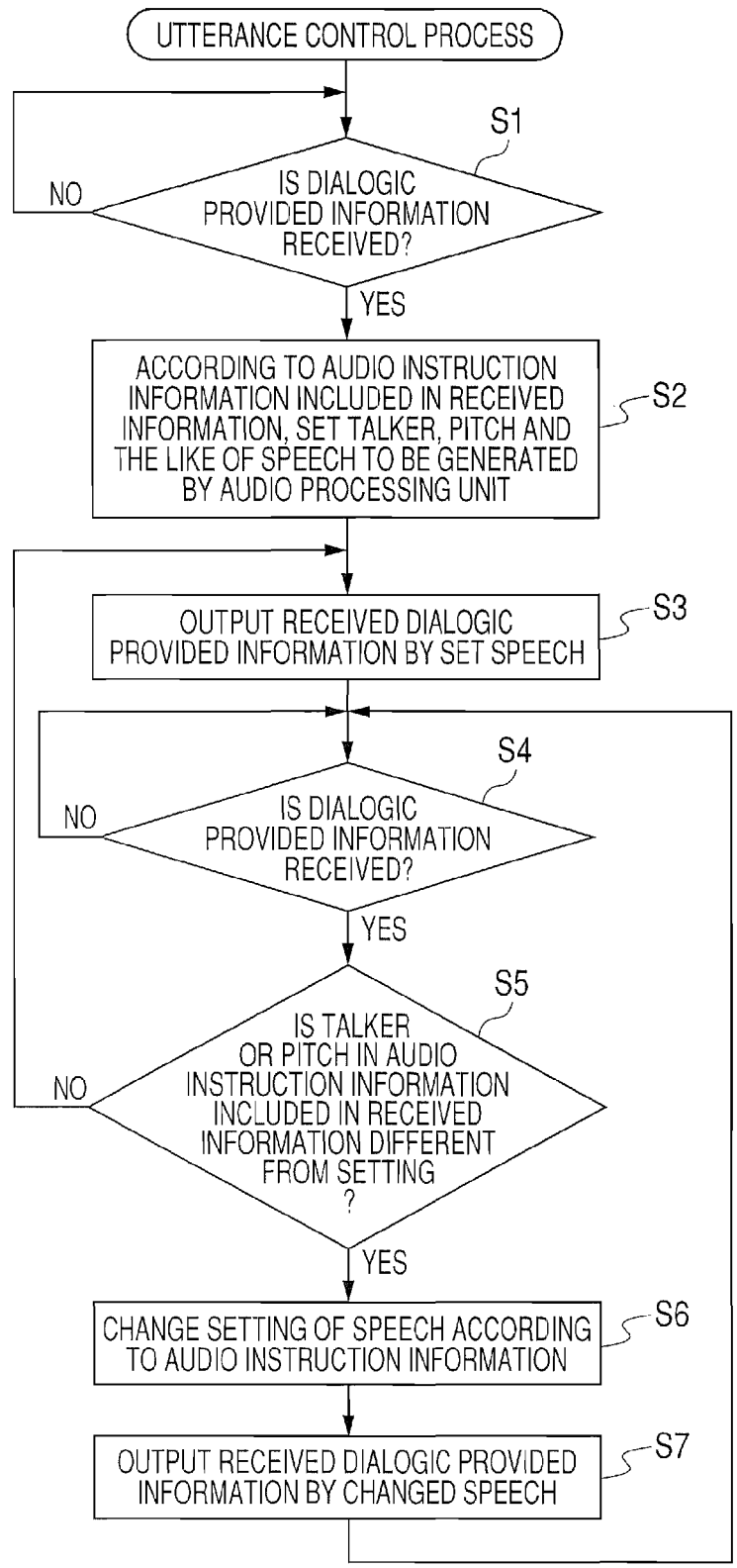
FIG. 5 is a flowchart showing an utterance control process executed by a control unit of the vehicle-mounted device of FIG. 4 in a first embodiment.

FIG. 5 shows a flow of the utterance control process executed by the vehicle-mounted device 10. The process is realized by a software process in cooperation of the control unit 11 and the utterance control processing program stored in the ROM 12.

First, the reception of the utterance type provided information from the roadside apparatus 20 via the communication unit 14 is waited for (step S1). When the utterance type provided information from the roadside apparatus 20 is received via the communication unit 14 (step S1; YES), according to the audio instruction information included in the received utterance type provided information, the information on the talker, the pitch and the like of synthesized speech to be generated is set in the audio processing unit 15 (step S2), and the utterance type provided information is outputted by the speech with the talker and the pitch which have been set, based on the speech reading-out information included in the received utterance type provided information, by the audio processing unit 15 and the loudspeaker 16 (step S3).

Next, the reception of the next utterance type provided information from the roadside apparatus 20 via the communication unit 14 is waited for (step S4). When the next utterance type provided information is received from the roadside apparatus 20 via the communication unit 14 (step S4; YES), it is determined whether or not at least any one of the talker and the pitch in the audio instruction information included in the utterance type provided information received this time is different from the setting in the audio processing unit 15, and if it is determined that at least any one of the talker and the pitch is different (step S5; YES), the setting of the synthesized speech in the audio processing unit 15 is changed based on the received audio instruction information (step S6), and the utterance type provided information is outputted by the speech whose setting has been changed, based on the speech reading-out information included in the received utterance type provided information, by the audio processing unit 15 and the loudspeaker 16 (step S7), and the process returns to step S4.

On the other hand, if it is determined that the talker and the pitch in the audio instruction information included in the utterance type provided information received this time are the same as the setting in the audio processing unit 15 (step S5; NO), the process returns to step S3, and the speech reading-out information included in the utterance type provided information is outputted by the speech similar to previous speech, by the audio processing unit 15 and the loudspeaker 16.

Until the power is turned OFF by an operation of the power key in the operation unit 17 of the vehicle-mounted device 10 or the like, the above described process is repeatedly executed.

As described above, according to the information distribution system 100 in the first embodiment, the utterance type provided information transmitted from the roadside apparatus 20 includes the audio instruction information according to the traveling direction to be provided with the above described utterance type provided information. When the vehicle-mounted device 10 receives the utterance type provided information from the roadside apparatus 20 via the communication unit 14, the vehicle-mounted device 10 outputs the utterance type provided information by different speech, according to the audio instruction information included in the received utterance type provided information.

Therefore, the driver can discriminate whether the utterance type provided information is information on the traveling direction of his own vehicle or information on another traveling direction, based on the speech by which the received utterance type provided information is outputted (uttered).

Second Embodiment

Next, a second embodiment of the present invention will be described.

Configuration of Second Embodiment

First, the configuration will be described.

The configuration of the information providing system 100 in the second embodiment is similar to that described using FIG. 1 in the first embodiment, and thus the description is cited.

Moreover, configurations of the respective units of the information providing system 100 are approximately similar to those of the first embodiment, and thus the descriptions thereof are cited, and only different portions will be described below.

In the second embodiment, the operation unit 17 of the vehicle-mounted device 10 has an "utterance prohibition" key and a "release utterance prohibition" key. The "utterance prohibition" key is a key for, if the speech by which the utterance type provided information is outputted has been changed, that is, if information on a traveling direction different from a previous traveling direction has been outputted and the driver has determined that the reception of the utterance type provided information on this different traveling direction is not correct, inputting an instruction to prohibit the speech output of the utterance type provided information including the audio instruction information corresponding to the above described direction which is subsequently received. The "release utterance prohibition" key is a key for inputting an instruction to release the prohibition of the speech output which has been set by the "utterance prohibition" key.

Moreover, the RAM 13 of the vehicle-mounted device 10 has an utterance-prohibited information reservation area for reserving the audio instruction information in the utterance type provided information for which the "utterance prohibition" key has been pushed down, as utterance-prohibited information.

Other configurations of the respective units of the information providing system 100 are similar to those described in the first embodiment, and thus the descriptions thereof are omitted.

(Operations of Information Providing System 100 in Second Embodiment)

Hereinafter, the operations of the information providing system 100 in the second embodiment will be described.

In the second embodiment, the utterance control process executed by the vehicle-mounted device 10 is different from the first embodiment.

Figure 6:
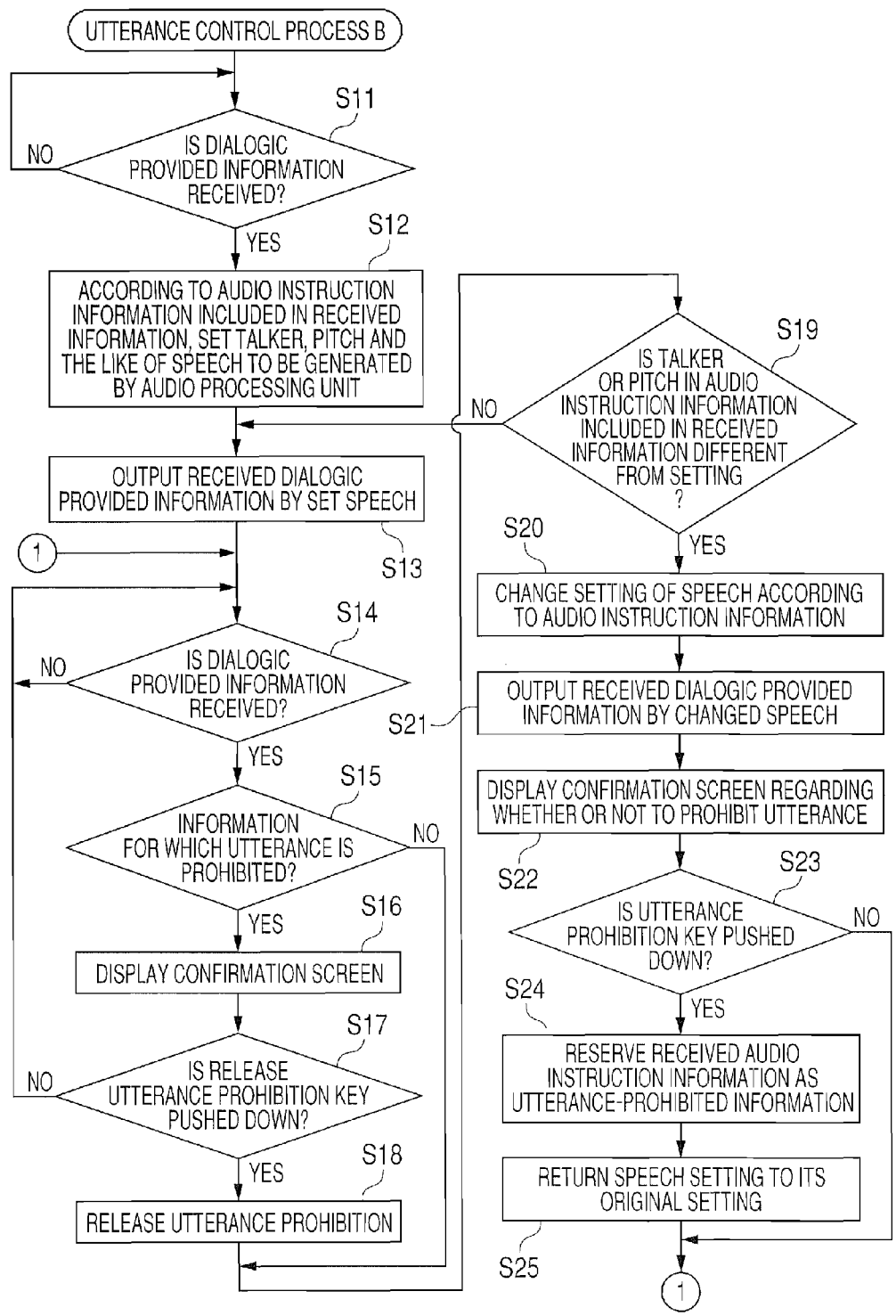
FIG. 6 is a flowchart showing an utterance control process B executed by the control unit of the vehicle-mounted device of FIG. 4 in a second embodiment.

FIG. 6 shows a flow of the utterance control process (hereinafter referred to as "utterance control process B" so that the process is distinguished from that of the first embodiment) executed by the vehicle-mounted device 10 in the second embodiment. The process is realized by a software process in cooperation of the control unit 11 and an utterance control processing B program stored in the ROM 12.

First, the reception of the utterance type provided information from the roadside apparatus 20 via the communication unit 14 is waited for (step S11). When the utterance type provided information from the roadside apparatus 20 is received via the communication unit 14 (step S11; YES), according to the audio instruction information included in the received utterance type provided information, the information on the talker, the pitch and the like of the synthesized speech to be generated is set in the audio processing unit 15 (step S12), and the utterance type provided information is outputted by the speech with the talker and the pitch which have been set, based on the speech reading-out information included in the received utterance type provided information, by the audio processing unit 15 and the loudspeaker 16 (step S13).

Next, the reception of the next utterance type provided information from the roadside apparatus 20 via the communication unit 14 is waited for (step S14). When the next utterance type provided information is received from the roadside apparatus 20 via the communication unit 14 (step S14; YES), the audio instruction information included in the received utterance type provided information is compared with the utterance-prohibited information stored in the RAM 13, and it is determined whether or not both coincide with each other, that is, whether or not the received utterance type provided information is the information for which the utterance is prohibited (step S15). If it is determined that the received utterance type provided information is the information for which the utterance is prohibited (step S15; YES), a confirmation screen for confirming that the speech output (utterance) of the received utterance type provided information is not performed is displayed on the display unit 19 (step S16). Here, when the confirmation screen is displayed in step S16, the direction code D2 included in the received utterance type provided information is referred to, and a message, for example, such as "The information on ΔΔ direction for which the utterance is prohibited has been received. If you release prohibition of the utterance of the information related to this direction, please push the "release utterance prohibition" key within o seconds" is displayed on the confirmation screen. Since such a confirmation screen is displayed, if the traveling direction of the vehicle C which is the vehicle itself has been changed to the direction for which the utterance is prohibited, it is possible to release the utterance prohibition and perform the speech output of the utterance type provided information according to the direction of the vehicle itself.

It should be noted that, in step S15, if it is determined that the received utterance type provided information is the information for which the utterance is prohibited, the number of times of the reception of each audio instruction information included in the received utterance type provided information may be counted and stored in the RAM 13, and if the number of times of the reception is less than a predetermined number of times, the process may return to step S14, and if the number of times of the reception becomes equal to or larger than the predetermined number of times, the above described confirmation screen may be displayed. Moreover, an operation key for resetting the utterance-prohibited information when the vehicle enters or exits a ring road, or the like, may be provided so that the utterance-prohibited information can be reset when the vehicle enters or exits the ring road.

If the "release utterance prohibition" key of the operation unit 17 is pushed down within a predetermined time (step S17; YES), the utterance-prohibited information which coincides with the audio instruction information included in the utterance type provided information received in step S14, in the utterance-prohibited information stored in the RAM 13, is deleted from the RAM 13, and thereby, the utterance prohibition of the utterance type provided information having the above described audio instruction information is released (step S18), and the process proceeds to step S19. On the other hand, if the "release utterance prohibition" key of the operation unit 17 has not been pushed down within the predetermined time (step S17; NO), the process returns to step S14, and the reception of the next information is waited for.

In step S19, it is determined whether or not at least any one of the talker and the pitch in the audio instruction information included in the utterance type provided information received this time is different from the setting in the audio processing unit 15, and if it is determined that the talker and the pitch are the same (step S19; NO), the process returns to step S13, and the utterance type provided information is outputted by the speech similar to the previous speech, by the audio processing unit 15 and the loudspeaker 16.

On the other hand, if it is determined that at least any one of the talker and the pitch in the audio instruction information included in the utterance type provided information received this time is different from the setting in the audio processing unit 15 (step S19; YES), the setting of the synthesized speech in the audio processing unit 15 is changed based on the received audio instruction information (step S20), and the utterance type provided information is outputted by the speech whose setting has been changed, based on the speech reading-out information included in the received utterance type provided information, by the audio processing unit 15 and the loudspeaker 16 (step S21). The setting before the change is temporarily stored in the RAM 13. Then, when the utterance type provided information related to the same traveling direction as the traveling direction to be provided with the utterance type provided information outputted by the changed speech is subsequently received, a confirmation screen for prompting to confirm whether or not to prohibit the speech output (utterance) is displayed on the display unit 19 (step S22).

Here, as described above, in the utterance type provided information transmitted from the roadside apparatus 20, in order to enable the driver to discriminate which traveling direction lane the utterance type provided information is related to, based on the speech by which the utterance type provided information is uttered, the audio instruction information has been set so that at least one of the talker and the pitch is different according to the direction code D2 indicating the traveling direction (inbound, outbound, inner lane, outer lane and the like) to be provided with the utterance type provided information. Therefore, the driver can discriminate whether the received utterance type provided information is the information on the traveling direction of his own vehicle or the information on another direction, based on the speech by which the received utterance type provided information is uttered. For example, in such a case where a radial electric wave emitted toward an adjacent lane in an opposite direction has been reflected by a vehicle traveling on a lane in an opposite direction or the like, and the reflected electric wave has been erroneously received by the vehicle-mounted device 10, the utterance type provided information is uttered by the speech different from the previous speech even though the traveling direction of his own vehicle is not changed, and therefore, the driver can discriminate that the received utterance type provided information is not the information on the lane on which his own vehicle travels.

Consequently, in the vehicle-mounted device 10, if the speech for the utterance type provided information has been changed, when the utterance type provided information related to the same traveling direction as the traveling direction to be provided with the utterance type provided information outputted by the changed speech is subsequently received, the confirmation screen for prompting to confirm whether or not to prohibit the speech output (utterance) is displayed on the display unit 19. On the confirmation screen, a message, for example, such as "The traveling direction to be provided with the information has been changed. Please confirm whether or not the traveling direction coincides with the traveling direction of your own vehicle, and if you prohibit the utterance of the information related to this direction, please push the "utterance prohibition" key within o seconds." is displayed. Moreover, the traveling direction to be provided with the previously received utterance type provided information and the traveling direction to be provided with the utterance type provided information received this time may be displayed like "inbound→outbound" or the like. If the utterance type provided information has been uttered by the speech different from the previous speech even though the traveling direction of his own vehicle is not changed, or the like, the driver can push down the "utterance prohibition" key of the operation unit 17 to perform setting so that the speech output of the utterance type provided information having the same audio instruction information, that is, the utterance type provided information related to the traveling direction different from the traveling direction of his own vehicle, is not subsequently performed.

If the "utterance prohibition" key of the operation unit 17 is not pushed down within a predetermined time (step S23; NO), the process returns to step S14. If the "utterance prohibition" key of the operation unit 17 is pushed down within the predetermined time (step S23; YES), the audio instruction information in the utterance type provided information received this time in step S14 is reserved in an utterance-prohibited information area of the RAM 13 (step S24), the speech setting in the audio processing unit 15 is returned to the setting before the change, which has been temporarily stored in the RAM 13 (step S25), and the process returns to step S14. Since the audio instruction information in the utterance type provided information received this time is reserved in the utterance-prohibited information area of the RAM 13 in step S24, when the utterance type provided information having the same information as this audio instruction information is subsequently received, it is possible to control not to perform the speech output of the above described utterance type provided information in steps S15 to S17.

Until the power is turned OFF by the operation of the power key in the operation unit 17 of the vehicle-mounted device 10, the above described process is repeatedly executed.

As described above, according to the information distribution system 100 in the second embodiment, the vehicle-mounted device 10 has the "utterance prohibition" key for, if the speech by which the utterance type provided information is outputted has been changed, that is, if the utterance type provided information on the direction different from the previous traveling direction has been outputted, prohibiting the speech output of the utterance type provided information including the audio instruction information corresponding to the above described direction which is subsequently received, and when the utterance type provided information having the same information as this audio instruction information is subsequently received, the vehicle-mounted device 10 controls not to perform the speech output of the utterance type provided information.

Therefore, if the utterance type provided information on the traveling direction different from the traveling direction of the vehicle itself has been received due to the reflection or leakage of the electric wave or the like, the setting can be performed so that the speech output of the utterance type provided information related to the traveling direction different from the traveling direction of the vehicle itself is not subsequently performed.

Third Embodiment

Next, a third embodiment of the present invention will be described.

Configuration of Third Embodiment

First, the configuration will be described.

The configuration of the information providing system 100 in the third embodiment is similar to that described using FIG. 1 in the first embodiment, and thus the description is cited.

Moreover, the configurations of the respective units of the information providing system 100 are approximately similar to those of the first embodiment, and thus the descriptions thereof are cited, and only different portions will be described below.

In the first embodiment, the speech reading-out information transmitted from the roadside apparatus 20 includes the audio instruction information which instructs about the speech by which the information described in the speech reading-out information is uttered, at the beginning part thereof, while, in the present embodiment, the information is outputted by the speech according to the direction code included in the utterance type provided information in the vehicle-mounted device 10, and thus the audio instruction information may be omitted.

In the present embodiment, the RAM 13 of the vehicle-mounted device 10 has a previous direction code reservation area for reserving the direction code D2 included in the received utterance type provided information, as a previously received direction code.

Figure 7:
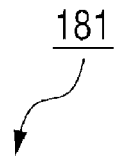
FIG. 7 is a diagram showing a data configuration example of a speech table 181 stored in a storage device of FIG. 4.

Moreover, a speech table 181 is previously stored in the storage device 18 of the vehicle-mounted device 10. FIG. 7 shows a data configuration example of the speech table 181. As shown in FIG. 7, in the speech table 181, the direction code and speech elements (the talker, the pitch and the like) for uttering the utterance type provided information having the above described direction code are stored so as to be associated with each other. It should be noted that, in the speech table 181, at least one of the talker and the pitch is set to be different depending on the direction code.

Other configurations of the respective units of the information providing system 100 are similar to those described in the first embodiment, and thus the descriptions thereof are omitted.

(Operations of Information Providing System 100 in Third Embodiment)

Hereinafter, the operations of the information providing system 100 in the third embodiment will be described.

In the third embodiment, the utterance control process executed by the vehicle-mounted device 10 is different from the first embodiment.

Figure 8:
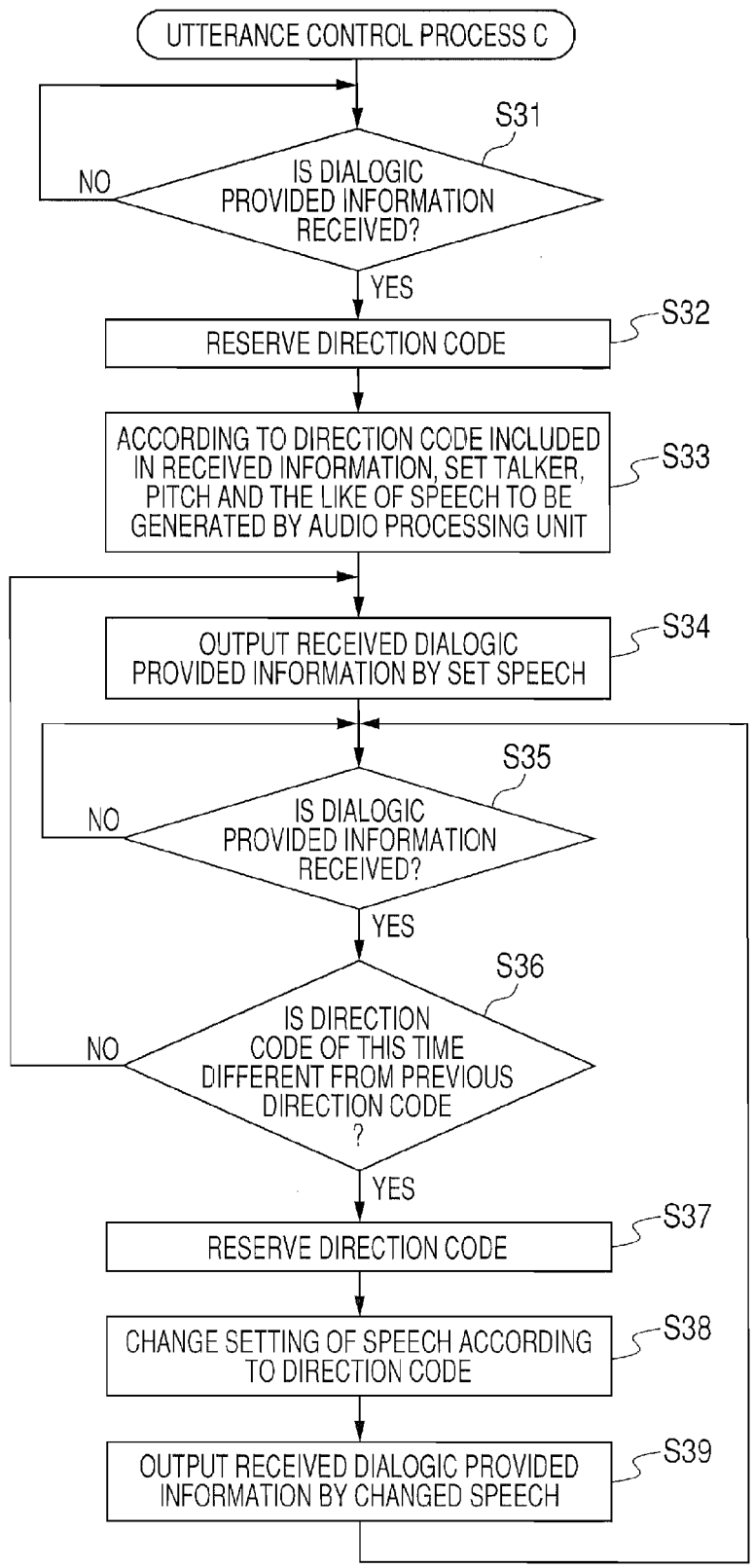
FIG. 8 is a flowchart showing an utterance control process C executed by the control unit of the vehicle-mounted device of FIG. 4 in a third embodiment.

FIG. 8 shows a flow of the utterance control process (hereinafter referred to as "utterance control process C" so that the process is distinguished from that of the first embodiment) executed by the vehicle-mounted device 10 in the third embodiment. The process is realized by a software process in cooperation of the control unit 11 and an utterance control processing C program stored in the ROM 12.

First, the reception of the utterance type provided information from the roadside apparatus 20 via the communication unit 14 is waited for (step S31). When the utterance type provided information from the roadside apparatus 20 is received via the communication unit 14 (step S31; YES), the direction code D2 included in the received utterance type provided information is reserved in the previous direction code reservation area in the RAM 13 (step S32).

Next, according to the direction code D2 included in the received utterance type provided information, the information on the talker, the pitch and the like of the synthesized speech to be generated is set in the audio processing unit 15 (step S33). Specifically, the speech table 181 stored in the storage device 18 is referred to, and the talker, the pitch and the like corresponding to the direction code D2 included in the information received this time are set in the audio processing unit 15. Then, the utterance type provided information is outputted by the speech with the talker and the pitch which have been set, based on the speech reading-out information included in the received utterance type provided information, by the audio processing unit 15 and the loudspeaker 16 (step S34).

Next, the reception of the next utterance type provided information from the roadside apparatus 20 via the communication unit 14 is waited for (step S35). When the next utterance type provided information is received from the roadside apparatus 20 via the communication unit 14 (step S35; YES), the previous direction code reservation area of the RAM 13 is referred to, and it is determined whether or not the direction code D2 included in the utterance type provided information received this time is different from a previous direction code stored in the RAM 13, and if it is determined that the direction code D2 included in the utterance type provided information received this time is different from the previous direction code stored in the RAM 13 (step S36; YES), the previous direction code reservation area of the RAM 13 is overwritten with the direction code D2 included in the utterance type provided information received this time, and the direction code D2 is reserved therein (step S37). Moreover, the setting of the synthesized speech in the audio processing unit 15 is changed based on the received direction code D2 (step S38). Specifically, the speech table 181 stored in the storage device 18 is referred to, and the talker, the pitch and the like corresponding to the direction code D2 included in the received information are set in the audio processing unit 15. Then, the utterance type provided information is outputted by the speech whose setting has been changed, based on the speech reading-out information included in the received utterance type provided information, by the audio processing unit 15 and the loudspeaker 16 (step S39), and the process returns to step S35.

On the other hand, if it is determined that the direction code D2 included in the utterance type provided information received this time is the same as the direction code included in the previously received utterance type provided information (step S36; NO), the process returns to step S34, and the speech reading-out information included in the utterance type provided information is outputted by the speech similar to the previous speech, by the audio processing unit 15 and the loudspeaker 16.

Until the power is turned OFF by the operation of the power key in the operation unit 17 of the vehicle-mounted device 10, the above described process is repeatedly executed.

As described above, according to the information distribution system 100 in the third embodiment, the utterance type provided information transmitted from the roadside apparatus 20 includes the direction code D2 indicating the traveling direction to be provided with the above described utterance type provided information. When the vehicle-mounted device 10 receives the utterance type provided information from the roadside apparatus 20 via the communication unit 14, the vehicle-mounted device 10 outputs the utterance type provided information by different speech, according to the direction code D2 included in the received utterance type provided information.

Therefore, the driver can discriminate whether the received utterance type provided information is the information on the traveling direction of his own vehicle or the information on another traveling direction, based on the speech by which the received utterance type provided information is outputted (uttered).

Fourth Embodiment

Next, a fourth embodiment of the present invention will be described.

Configuration of Fourth Embodiment

First, the configuration will be described.

The configuration of the information providing system 100 in the fourth embodiment is similar to that described using FIG. 1 in the first embodiment, and thus the description is cited.

Moreover, the configurations of the respective units of the information providing system 100 are approximately similar to those of the third embodiment, and thus the descriptions thereof are cited, and only different portions will be described below.

In the fourth embodiment, the operation unit 17 of the vehicle-mounted device 10 has the "utterance prohibition" key and the "release utterance prohibition" key. The "utterance prohibition" key is a key for, if the speech by which the utterance type provided information is outputted has been changed, that is, if the utterance type provided information on the traveling direction different from the previous traveling direction has been outputted and the driver has determined that the reception of the information on this different traveling direction is not correct, inputting an instruction to prohibit the speech output of the utterance type provided information including the direction code D2 of the above described direction which is subsequently received. The "release utterance prohibition" key is the key for inputting the instruction to release the prohibition of the speech output which has been set by the "utterance prohibition" key.

Moreover, the RAM 13 of the vehicle-mounted device 10 has the utterance-prohibited information reservation area for reserving the direction code D2 in the utterance type provided information for which the "utterance prohibition" key has been pushed down, as the utterance-prohibited information.

Other configurations of the respective units of the information providing system 100 are similar to those described in the third embodiment, and thus the descriptions thereof are omitted.

(Operations of Information Providing System 100 in Fourth Embodiment)

Hereinafter, the operations of the information providing system 100 in the fourth embodiment will be described.

In the fourth embodiment, the utterance control process executed by the vehicle-mounted device 10 is different from the first embodiment.

Figure 9:
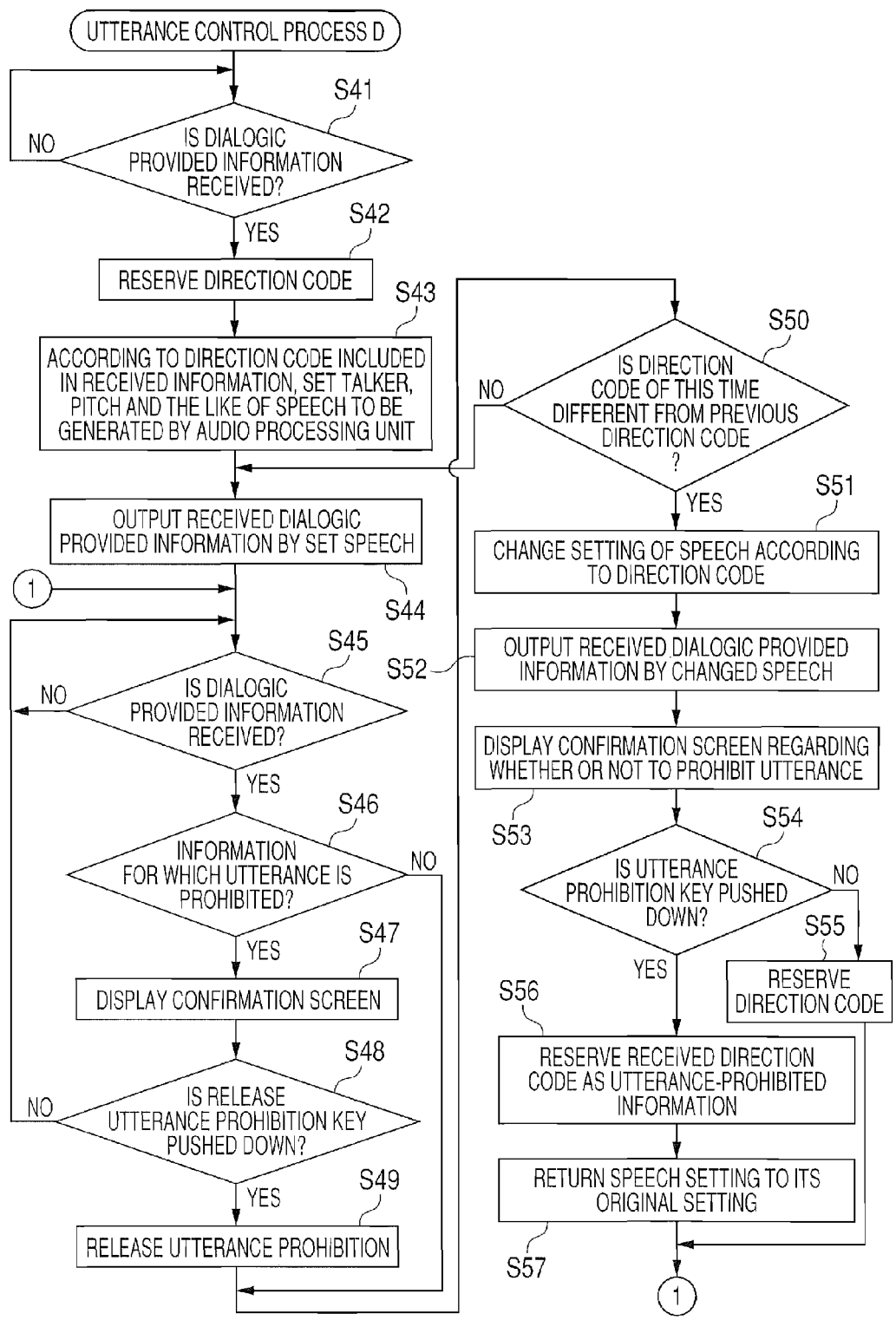
FIG. 9 is a flowchart showing an utterance control process D executed by the control unit of the vehicle-mounted device of FIG. 4 in a fourth embodiment.

FIG. 9 shows a flow of the utterance control process (hereinafter referred to as "utterance control process D" so that the process is distinguished from that of the first embodiment) executed by the vehicle-mounted device 10 in the fourth embodiment. The process is realized by a software process in cooperation of the control unit 11 and an utterance control processing D program stored in the ROM 12.

First, the reception of the utterance type provided information from the roadside apparatus 20 via the communication unit 14 is waited for (step S41). When the utterance type provided information from the roadside apparatus 20 is received via the communication unit 14 (step S41; YES), the direction code D2 included in the received utterance type provided information is reserved in the previous direction code reservation area in the RAM 13 (step S42).

Next, based on the direction code D2 included in the received utterance type provided information, the information on the talker, the pitch and the like of the synthesized speech to be generated is set in the audio processing unit 15 (step S43). Specifically, the speech table 181 stored in the storage device 18 is referred to, and the talker, the pitch and the like corresponding to the direction code D2 included in the received information are set in the audio processing unit 15. Next, the utterance type provided information is outputted by the speech with the talker and the pitch which have been set, based on the speech reading-out information included in the received utterance type provided information, by the audio processing unit 15 and the loudspeaker (step S44).

Next, the reception of the next utterance type provided information from the roadside apparatus 20 via the communication unit 14 is waited for (step S45). When the next utterance type provided information is received from the roadside apparatus 20 via the communication unit 14 (step S45; YES), the direction code D2 included in the received utterance type provided information is compared with the utterance-prohibited information stored in the RAM 13, and it is determined whether or not both coincide with each other, that is, whether or not the received utterance type provided information is the information for which the utterance is prohibited (step S46). If it is determined that the received utterance type provided information is the information for which the utterance is prohibited (step S46; YES), the confirmation screen for confirming that the speech output (utterance) of the received utterance type provided information is not performed is displayed on the display unit 19 (step S47). Here, when the confirmation screen is displayed in step S47, the direction code D2 included in the received utterance type provided information is referred to, and a message, for example, such as "The information on ΔΔ direction for which the utterance is prohibited has been received. If you prohibit the utterance of the information related to this direction, please push the "release utterance prohibition" key within o seconds" is displayed on the confirmation screen. Since such a confirmation screen is displayed, if the traveling direction of the vehicle C which is the vehicle itself has been changed to the direction for which the utterance is prohibited, it is possible to release the utterance prohibition and perform the speech output of the utterance type provided information according to the direction of the vehicle itself.

It should be noted that, in step S46, if it is determined that the received utterance type provided information is the information for which the utterance is prohibited, the number of times of the reception of each direction code included in the received utterance type provided information may be counted and stored in the RAM 13, and if the number of times of the reception is less than a predetermined number of times, the process may return to step S45, and if the number of times of the reception becomes equal to or larger than the predetermined number of times, the above described confirmation screen may be displayed. Moreover, the operation key for resetting the utterance-prohibited information when the vehicle enters or exits the ring road, or the like, may be provided so that the utterance-prohibited information can be reset when the vehicle enters or exits the ring road.

If the "release utterance prohibition" key of the operation unit 17 is pushed down within the predetermined time (step S48; YES), the utterance-prohibited information which coincides with the direction code D2 included in the utterance type provided information received in step S45, in the utterance-prohibited information stored in the RAM 13, is deleted from the RAM 13, and thereby, the utterance prohibition of the utterance type provided information having the above described direction code D2 is released (step S49), and the process proceeds to step S50. On the other hand, if the "release utterance prohibition" key of the operation unit 17 has not been pushed down within the predetermined time (step S48; NO), the process returns to step S45, and the reception of the next utterance type provided information is waited for.

In step S50, the previous direction code reservation area of the RAM 13 is referred to, it is determined whether or not the direction code D2 included in the utterance type provided information received this time is different from the direction code included in the previously received utterance type provided information, and if it is determined that the direction code D2 included in the utterance type provided information received this time is the same as the direction code included in the previously received utterance type provided information (step S50; NO), the process returns to step S44, and the utterance type provided information is outputted by the speech similar to the previous speech, by the audio processing unit 15 and the loudspeaker 16.

On the other hand, if it is determined that the direction code D2 included in the utterance type provided information received this time is different from the direction code included in the previously received utterance type provided information (step S50; YES), the setting of the synthesized speech in the audio processing unit 15 is changed based on the received direction code D2 (step S51). Specifically, the speech table 181 stored in the storage device 18 is referred to, and the talker, the pitch and the like corresponding to the direction code D2 included in the information received this time are set in the audio processing unit 15. It should be noted that the setting before the change is temporarily stored in the RAM 13. Then, the utterance type provided information is outputted by the speech whose setting has been changed, based on the speech reading-out information included in the received utterance type provided information, by the audio processing unit 15 and the loudspeaker 16 (step S52), and also, when the utterance type provided information related to the same traveling direction as the traveling direction to be provided with the utterance type provided information outputted by the changed speech is subsequently received, the confirmation screen for prompting to confirm whether or not to prohibit the speech output (utterance) is displayed on the display unit 19 (step S53).

Here, in the vehicle-mounted device 10, in order to enable the driver to discriminate which traveling direction lane the received utterance type provided information is related to, based on the speech by which the utterance type provided information is uttered, the utterance control process D is executed, and thereby, the speech is outputted so that at least one of the talker and the pitch is different depending on the direction code D2 included in the received utterance type provided information. Therefore, the driver can discriminate whether the received utterance type provided information is the information on the traveling direction of his own vehicle or the information on another traveling direction, based on the speech by which the received utterance type provided information is uttered. For example, in such a case where the radial electric wave emitted toward the adjacent lane in the opposite direction has been reflected by the vehicle traveling on the lane in the opposite direction or the like, and the reflected electric wave has been erroneously received by the vehicle-mounted device 10, the utterance type provided information is uttered by the speech different from the previous speech even though the traveling direction of his own vehicle is not changed, and therefore, the driver can discriminate that the received information is not the information on the lane on which his own vehicle travels.

Consequently, in the vehicle-mounted device 10, if the speech for the utterance type provided information has been changed, when the utterance type provided information related to the same traveling direction as the traveling direction to be provided with the utterance type provided information outputted by the changed speech is subsequently received, the confirmation screen for prompting to confirm whether or not to prohibit the speech output (utterance) is displayed on the display unit 19. On the confirmation screen, the message, for example, such as "The traveling direction to be provided with the information has been changed. Please confirm whether or not the traveling direction coincides with the traveling direction of your own vehicle, and if you prohibit the utterance of the information related to this direction, please push the "utterance prohibition" key within o seconds." is displayed. Moreover, the traveling direction to be provided with the previously received utterance type provided information and the traveling direction to be provided with the utterance type provided information received this time may be displayed like "inbound→outbound" or the like. If the utterance type provided information has been uttered by the speech different from the previous speech even though the traveling direction of his own vehicle is not changed, or the like, the driver can push down the "utterance prohibition" key of the operation unit 17 to perform setting so that the speech output of the utterance type provided information having the same direction code D2, that is, the utterance type provided information related to the lane in the traveling direction different from the traveling direction of his own vehicle, is not subsequently performed.

If the "utterance prohibition" key of the operation unit 17 is not pushed down within a predetermined time (step S54; NO), the previous direction code reservation area of the RAM 13 is overwritten with the direction code D2 included in the utterance type provided information received this time, and the direction code D2 is reserved therein (step S55), and the process returns to step S45.

On the other hand, if the "utterance prohibition" key of the operation unit 17 is pushed down within the predetermined time (step S54; YES), the direction code D2 in the utterance type provided information received this time in step S45 is reserved in the utterance-prohibited information area of the RAM 13 (step S56), the speech setting in the audio processing unit 15 is returned to the setting before the change, which has been temporarily stored in the RAM 13 (step S57), and the process returns to step S45. Since the direction code D2 in the utterance type provided information received this time is reserved in the utterance-prohibited information area of the RAM 13 in step S56, when the utterance type provided information having this direction code D2 is subsequently received, it is possible to control not to perform the speech output of the above described utterance type provided information in steps S46 to S48.

Until the power is turned OFF by the operation of the power key in the operation unit 17 of the vehicle-mounted device 10, the above described process is repeatedly executed.

As described above, according to the information distribution system 100 in the fourth embodiment, the vehicle-mounted device 10 has the "utterance prohibition" key for, if the speech by which the utterance type provided information is outputted has been changed, that is, if the utterance type provided information on the traveling direction different from the previous traveling direction has been outputted, prohibiting the speech output of the utterance type provided information including the direction code of the above described direction which is subsequently received, and when the utterance type provided information having the same information as this direction code is subsequently received, the vehicle-mounted device 10 controls not to perform the speech output of the utterance type provided information.

Therefore, if the utterance type provided information on the traveling direction different from the traveling direction of the vehicle itself has been received due to the reflection or the leakage of the electric wave or the like, the setting can be performed so that the speech output of the utterance type provided information related to the direction different from the traveling direction of the vehicle itself is not subsequently performed.

While the first to fourth embodiments of the present invention have been described above, the descriptions in the above described first to fourth embodiments are an example of the information distribution system according to the present invention, and the present invention is not limited thereto.

Moreover, a detailed configuration and detailed operations of the information distribution system in the above described embodiments can also be changed as appropriate in the scope not deviating from the gist of the present invention.

Moreover, regarding the information distribution system in the above described embodiments, the above described embodiments are preferably applied to the utterance type vehicle-mounted device not having means for discriminating latitude, longitude or the direction, while the vehicle-mounted device is not limited to be utterance type.

The invention claimed is:

1. An information distribution system comprising a roadside apparatus for transmitting provided information to a vehicle and a vehicle-mounted device for performing wireless communication with the roadside apparatus the vehicle-mounted device comprising:
   a reception unit configured to perform wireless communication with the roadside apparatus to receive the provided information;
   an operation unit configured to prohibit an audio output of a speech signal or release the prohibition of the audio output;
   a first storage unit configured to store setting information when audibly outputting the speech signal in response to audio instruction information included in the provided information received by the reception unit;
   a second storage unit configured to store utterance prohibition information to be used to prohibit of the audio output instructed by the operation unit;
   a control unit configured to execute control so as to audibly output the provided information; and
   an audio output unit configured to audibly output a speech signal,
   wherein the control unit has judgment means for judging whether the audio instruction information included in the provided information received by the reception unit coincides with the utterance prohibition information stored in the second storage unit and release means for releasing the utterance prohibition if it is judged by the judgment means that the audio instruction information coincides with the utterance prohibition information and the release of the utterance prohibition is instructed by the operation unit.

2. The information distribution system according to claim 1, wherein if the release of the utterance prohibition is instructed within a predetermined time period after the judgment means judges the coincidence, the control unit executes the control so as to audibly output the speech signal in response to the audio instruction information included in the provided information received by the reception unit.

3. The information distribution system according to claim 1, wherein the setting information is at least one of a talker of a pitch of the provided information, and if the at least one of the talker and the pitch of the audio instruction information included in the provided information received by the reception unit is different from the setting information stored in the first storage unit, the control unit changes the setting information.

4. A vehicle-mounted device comprising:
- a reception unit configured to perform wireless communication with a roadside apparatus to receive provided information;
- an operation unit configured to prohibit an audio output of a speech signal or release the prohibition of the audio output;
- a first storage unit configured to store setting information when audibly outputting the speech signal in response to audio instruction information included in the provided information received by the reception unit;
- a second storage unit configured to store utterance prohibition information to be used to prohibit the utterance of the audio instruction information by the operation unit;
- a control unit configured to cause the provided information to be audibly outputted; and
- an audio output unit configured to audibly output,
- wherein the control unit has judgment means for judging whether the audio instruction information included in the provided information received by the reception unit coincides with the utterance prohibition information stored in the second storage unit and release means for releasing the utterance prohibition if it is judged by the judgment means that the audio instruction information coincides with the utterance prohibition information and the release of the utterance prohibition is instructed by the operation unit.

5. The information distribution system according to claim 4, wherein if the release of the utterance prohibition is instructed within a predetermined time period after the judgment means judges the coincidence, the control unit executes the control so as to audibly output the speech signal in response to the audio instruction information included in the provided information received by the reception unit.

6. The information distribution system according to claim 4, wherein the setting information is at least one of a talker of a pitch of the provided information, and if the at least one of the talker and the pitch of the audio instruction information included in the provided information received by the reception unit is different from the setting information stored in the first storage unit, the control unit changes the setting information.

* * * * *